(12) United States Patent
Beck et al.

(10) Patent No.: US 12,455,334 B2
(45) Date of Patent: Oct. 28, 2025

(54) MAGNETIC RESONANCE TOMOGRAPHY SYSTEM AND METHOD FOR ENERGY-SAVING OPERATION OF THE MAGNETIC RESONANCE TOMOGRAPHY SYSTEM

(71) Applicant: Siemens Healthcare GmbH, Erlangen (DE)

(72) Inventors: Thomas Beck, Dormitz (DE); Sven Helmecke, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 191 days.

(21) Appl. No.: 18/225,835

(22) Filed: Jul. 25, 2023

(65) Prior Publication Data

US 2024/0027557 A1 Jan. 25, 2024

(30) Foreign Application Priority Data

Jul. 25, 2022 (EP) .................................... 22186742

(51) Int. Cl.
*G01R 33/54* (2006.01)
(52) U.S. Cl.
CPC .................. *G01R 33/543* (2013.01)
(58) Field of Classification Search
CPC .... G01R 33/543; G01R 33/546; A61B 5/055; A61B 5/704
See application file for complete search history.

(56) References Cited

U.S. PATENT DOCUMENTS

| | | | |
|---|---|---|---|
| 2003/0202428 A1 | 10/2003 | Ito | |
| 2006/0253022 A1* | 11/2006 | Omernick | A61B 8/00 600/407 |
| 2010/0241888 A1 | 9/2010 | Kaneko | |
| 2013/0127467 A1 | 5/2013 | Yokoi et al. | |
| 2015/0271904 A1 | 9/2015 | Heidinger et al. | |
| 2015/0312999 A1 | 10/2015 | Takahashi | |

(Continued)

FOREIGN PATENT DOCUMENTS

| | | |
|---|---|---|
| CN | 110988761 A | 4/2020 |
| JP | 2010256939 A | 11/2010 |

(Continued)

OTHER PUBLICATIONS

European Search Report for EP Application No. 22186742.7 mailed Jan. 24, 2023.

(Continued)

*Primary Examiner* — G. M. A Hyder
(74) *Attorney, Agent, or Firm* — Lempia Summerfield Katz LLC

(57) ABSTRACT

A method for operating a magnetic resonance tomography system and a magnetic resonance tomography system for executing the method are provided. The magnetic resonance tomography system captures a change in state using a control system, assesses the change in state with respect to a possible operating interruption, and determines possible energy-saving scenarios for the possible imminent interruption of the image recording. The magnetic resonance tomography system captures a selection made by a user and implements the selected energy-saving scenario.

15 Claims, 2 Drawing Sheets

(56) References Cited

U.S. PATENT DOCUMENTS

| | | | |
|---|---|---|---|
| 2016/0069975 A1* | 3/2016 | Rothberg | G01R 33/5608 |
| | | | 324/322 |
| 2016/0161581 A1 | 6/2016 | Oh et al. | |
| 2020/0100733 A1 | 4/2020 | Biber et al. | |

FOREIGN PATENT DOCUMENTS

| | | |
|---|---|---|
| JP | 2014132933 A | 7/2014 |
| JP | 2020046851 A | 3/2020 |
| WO | 2018206570 A1 | 11/2018 |

OTHER PUBLICATIONS

European Search Report for EP Application No. 22186742.7 mailed Jan. 24, 2023, with English translation.
"Magnetom Sempra" Jul. 2016. pp. 1-1.

* cited by examiner

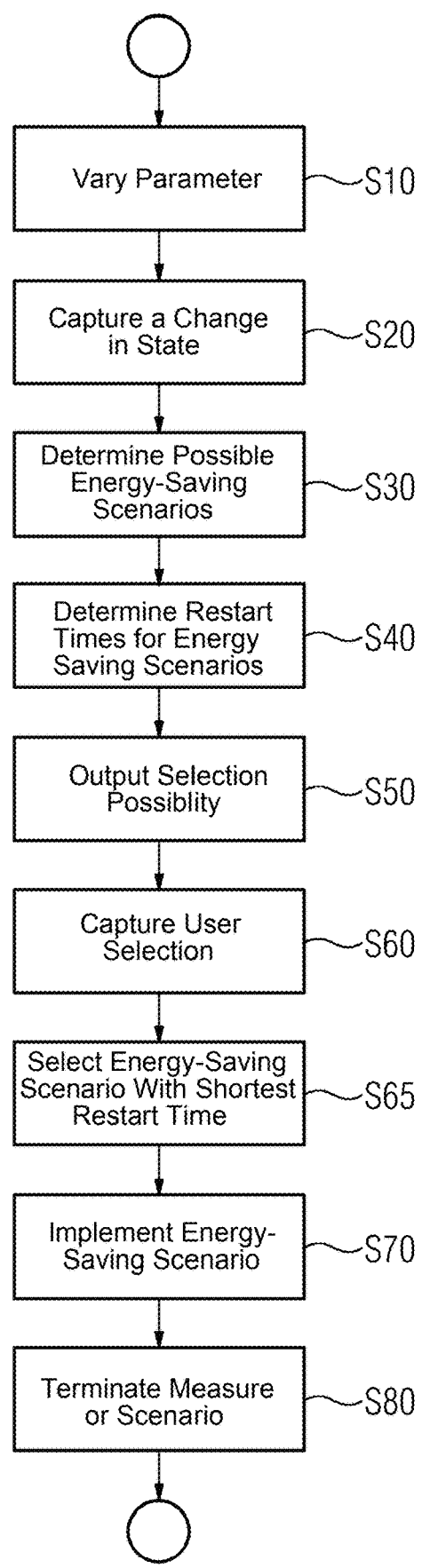

MAGNETIC RESONANCE TOMOGRAPHY SYSTEM AND METHOD FOR ENERGY-SAVING OPERATION OF THE MAGNETIC RESONANCE TOMOGRAPHY SYSTEM

This application claims the benefit of European Patent Application No. EP 22186742.7, filed on Jul. 25, 2022, which is hereby incorporated by reference in its entirety.

BACKGROUND

The present embodiments relate to a magnetic resonance tomography system and to a method for energy-saving operation of the magnetic resonance tomography system. The magnetic resonance tomography system detects a change in state and proposes an energy-saving scenario.

Magnetic resonance tomography systems are imaging apparatuses that, for the purpose of depicting an examination object, align nuclear spins of the examination object using a strong external magnetic field and excite the nuclear spins into precession about this alignment using a magnetic alternating field. The precession or return of the spins from this excited state into a state having lower energy then generates, in response, a magnetic alternating field that is received via antennas.

Magnetic gradient fields are used to impress a spatial encoding onto the signals. The spatial encoding subsequently allows an assignment of the received signal to a volume element. The received signal is then evaluated, and a three-dimensional imaging representation of the examination object is provided. For the purpose of receiving the signal, use may be made of local receive antennas (e.g., local coils) that are arranged directly on the examination object in order to achieve a better signal-to-noise ratio.

The energy intake of a magnetic resonance tomography system contributes significantly to the operating costs. Certain subsystems of the magnetic resonance tomography system may be quickly deactivated and reactivated. However, others such as the cooling system or power supply require considerable time to be shut down or reactivated. The magnetic resonance tomography system does not usually know when operation is to recommence. Therefore, for reasons of availability, only subsystems with a short initialization time are ever deactivated, even though this limits the energy-saving effect.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a magnetic resonance tomography system and a method of operation that allows greater savings are provided.

The method of the present embodiments is provided for the purpose of operating a magnetic resonance tomography system. The magnetic resonance tomography system has a control system. The control system is provided to control the recording of images. For example, the control system is also configured such that the control system may switch energy-intensive components of the magnetic resonance tomography system into an energy-saving idle state and reactivate the energy-intensive components from this state again, either directly or using control commands to subsidiary control systems. An energy-saving idle state may be, for example, a state of a unit in which the energy consumption of the unit is reduced in comparison with an image recording or a standby mode having a very short restart time of less than 1 minute, 30 seconds, 10 seconds, or 1 second, or having no restart time.

In an act of the method, the control system captures a change in state of the magnetic resonance tomography system. This may be effected by sensors that capture a position of the patient couch or the patient, for example. For as long as the patient couch is outside the patient tunnel or no patient is on the patient couch, for example, no image recording is likely. The capture of the change in state may also take place based on the evaluation of user inputs. If, for example, a new sequence is started, no energy-saving measure may be executed or energy-saving scenario implemented for the duration of the sequence. Conversely, when there is an internal change in state (e.g., the termination of a sequence by the control system or the expiry of a timer since the last interaction of the user), the execution of energy-saving scenarios by energy-saving measures becomes possible again.

For example, the control system assesses whether the change in state indicates an operating interruption. In other words, the control system checks whether the change in state allows, makes probable, or even forces an operating interruption (e.g., with a potential energy-saving measure). This may be achieved, for example, by the control system comparing the change in state with a stored database. For every change in state, the database may indicate whether a change in state results in an operating interruption that allows an energy-saving measure, or whether the change is state is frequently followed by such an operating interruption during operation. The database may also indicate, for example, probabilities of occurrence, average duration of the interruption, and/or subsystems that may potentially be closed down for the purpose of energy saving. The information may also be obtained and adapted by the control system itself by observing the live operation. In one embodiment, collected data from the operation of many subsystems may be evaluated and stored in the database in advance.

The evaluation may take place manually, automatically, or, for example, using artificial intelligence. If the evaluation takes place using artificial intelligence in the control system of the magnetic resonance tomography system or in a control system that is connected thereto (e.g., a cloud), the control system is able to continuously adapt the assessment to the respective local usage habits and user profile.

In a further act of the method, the control system determines a plurality of possible energy-saving scenarios for an imminent or potentially imminent interruption of the image recording as a function of the change in state. The scenarios may be determined as a function of the state that occurs as a result of the change in state and/or a duration of an expected interruption. For example, some subsystems are not required in some states.

In another act of the method, the control system determines restart times for the possible energy-saving scenarios that have been determined. For example, for individual subsystems, values for the restart scenarios may be saved in a memory of the control system or in a cloud. If the relevant subsystems are independent, for an energy-saving scenario, the longest restart time of an individual relevant subsystem is the restart time for the whole energy-saving scenario. If there are mutual dependencies between the subsystems, it may also be possible for individual restart times to be added together to give a total restart time.

In a further act of the method, a selection possibility for a plurality of the energy-saving scenarios is output to a user. The selection possibility includes at least two different energy-saving scenarios that are offered for selection in a list or table, for example. This may take place on a display at the magnetic resonance tomography system, for example. For example, the selection possibility also offers an input possibility that allows the user to make a selection. This may be a touch screen, buttons assigned to a display, or simply a keyboard or mouse.

The method allows a user, by virtue of their external view of the procedures around the magnetic resonance tomography system and the internal view, supplied by the method, of the internal processes of the magnetic resonance tomography system, to provide a particularly energy-saving operation in a simple manner.

The magnetic resonance tomography system of the present embodiments shares the advantages of the method of the present embodiments that is executed thereon.

In a possible embodiment variant of the method, the method further includes the act of capturing a user selection of an energy-saving scenario by the control system. The capture of the user input may take place on a device where the output of the selection possibility also takes place. In the case of a display at the magnetic resonance tomography system, this may be an input element such as buttons or rotary selectors on the display, or even the display itself if the display is configured as a touch screen. In the case of a remote operating terminal in the adjoining room, the capture of the user input may also involve an input device such as a keyboard, mouse, or touch screen. A tablet may also be provided for the output and/or for capturing the input. Even a voice-controlled interface may be provided, the selection possibilities being output acoustically and/or the user selection being captured using voice control. Gesture recognition using a camera may also be provided.

The energy-saving scenario selected as a result of the user selection is then implemented by the control system. In this case, the subsystems corresponding to the selected energy-saving scenario may be switched into an energy-saving idle state. For example, the control system shuts down the relevant subsystems and then interrupts the energy supply of the corresponding subsystems. In the case of simple subsystems such as, for example, a detuning facility of the local coils, it may also be sufficient to interrupt the energy supply directly. In one embodiment, the subsystems may have their own control systems, and the control system of the magnetic resonance tomography system may switch the subsystems into an idle state using a control command to the control systems of the subsystems.

The selection of an energy-saving scenario may make it easier for the user to reduce the energy consumption.

In an embodiment variant of the method, after a predetermined time without user input following the output step, the control system selects the energy-saving scenario having the shortest restart time. The control system then implements the energy-saving scenario as described above.

The activation of a default energy-saving scenario even without user intervention may allow a reduction in the energy consumption.

In a possible embodiment variant of the method, in the act for determining the energy-saving scenarios, the determination takes place as a function of a parameter. A plurality of parameters may also be provided. The parameter may be predefined by the magnetic resonance tomography system (e.g., a time that is required to restart from the energy-saving scenario). The level of energy saving to be achieved may also be provided. The parameter may also depend on the captured change in state of the magnetic resonance tomography system. Parameters that depend on the use of the magnetic resonance tomography system may also be provided. For example, a time may be predetermined by operational procedures of the radiological department (e.g., a minimum time that is required between the recording of two images due to a change of patients).

In a further act, the user varies this parameter via a user dialog, or the control system is configured to change the parameter in a user dialog.

The user may therefore be in a position to adapt the energy saving adjustments to the operational procedures.

Instead of user inputs, an algorithm or artificial intelligence in the control system may adapt autonomously to the operational practice by recording the operational procedures of many image recordings.

In an embodiment variant of the method, in the output step, the control system sends the selection possibilities to a remote operating interface for output. This may be, for example, a remote operating computer in the adjoining room or an operating terminal that is linked via a data network. A wirelessly linked tablet computer may also be provided. Accordingly, in the act for selecting an energy-saving scenario, the control system receives a user selection from the operating interface (e.g., via a keyboard input, mouse selection, or touch screen).

A remote operating interface may also allow an energy saving to be activated from a distance.

In a possible embodiment variant of the magnetic resonance tomography system, the magnetic resonance tomography system has operating elements for inputting the selection made by the user. These may be a touch screen at the device itself or, for example, a haptic or tactile operating element such as, for example, one or more buttons at the magnetic resonance tomography system. The magnetic resonance tomography system captures the user input for selecting the energy-saving scenario using the operating elements.

The operating element at the magnetic resonance tomography system may allow direct and reliable selection.

In an embodiment variant of the method, provision is made for an act in which, in response to a user input, the magnetic resonance tomography system terminates the energy-saving measure or energy-saving measures as activated in accordance with the energy-saving scenario that was selected and executed, and restarts or powers up the relevant subsystems. In this case, the user input may take place using one, a plurality, or all of the operating elements of the magnetic resonance tomography system. A dedicated operating element such as a wake-up button may be provided. Also possible as a user input for termination is the activation of operating elements at the magnetic resonance tomography system (e.g., the control buttons for the patient couch).

Use of an operating element for the wake-up may avoid restarting by a laborious procedure involving a sequence of commands via the operating interface.

BRIEF DESCRIPTION OF THE DRAWINGS

The properties, features, and advantages of the invention as described above and the manner in which these are achieved become clearer and easier to understand in connection with the following description of the exemplary embodiments, these being explained in greater detail in connection with the drawings, in which:

FIG. 3 shows a schematic sequence plan of an embodiment of the method.

DETAILED DESCRIPTION

Figure 1:
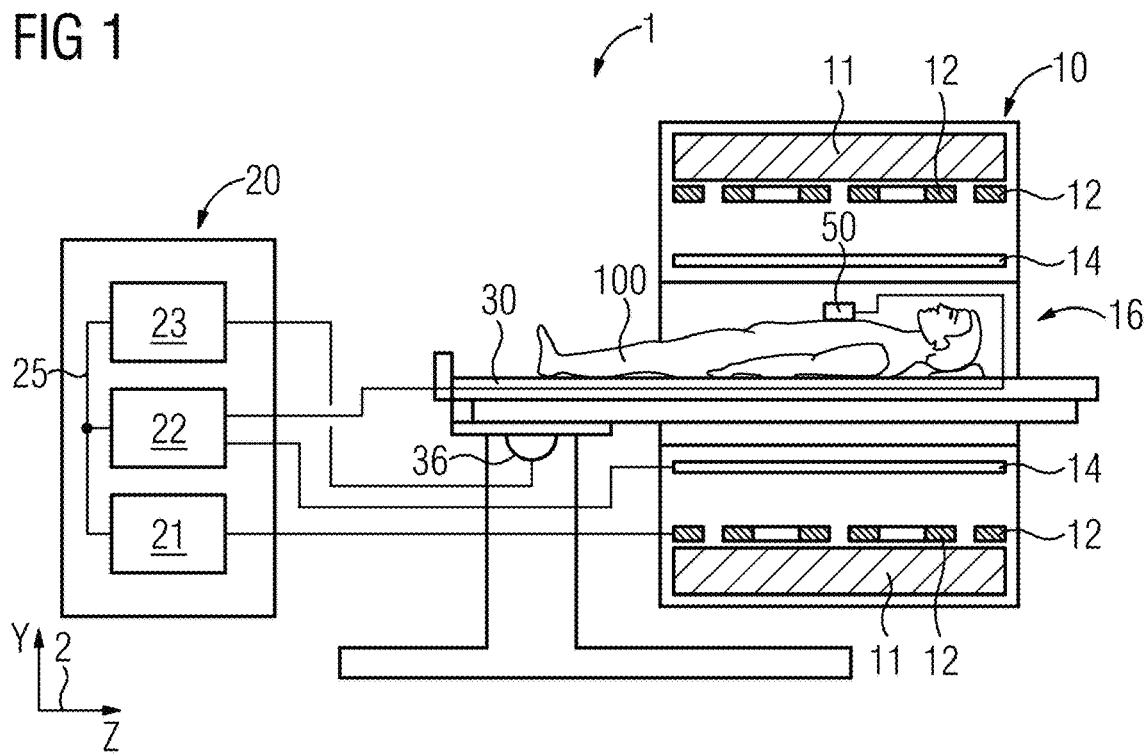
FIG. 1 shows a schematic representation of one embodiment of a magnetic resonance tomography system.

FIG. 1 shows a schematic representation of an embodiment variant of a magnetic resonance tomography system 1.

A magnet unit 10 has a field magnet 11 that generates a static magnetic field BO for the purpose of aligning nuclear spins of a specimen or patient 100 in a recording region. The recording region is disposed in a patient tunnel 16 that extends through the magnet unit 10 in a longitudinal direction 2. A patient 100 may be moved into the recording region by a patient couch 30 and a drive unit 36 of the patient couch 30. The field magnet 11 may be a superconducting magnet that may provide magnetic fields with a magnetic flux density of up to 3 T and even more using the latest devices. Permanent magnets or electromagnets with normally conducting coils may, however, be used for lower field strengths.

The magnet unit 10 also has gradient coils 12 that are configured to superimpose variable magnetic fields onto the magnetic field BO in three spatial directions in order to achieve spatial differentiation of the imaging regions that are captured in the examination volume. The gradient coils 12 may be coils made from normally conducting wires that may generate mutually orthogonal fields in the examination volume.

The magnet unit 10 also has a body coil 14 that is configured to beam a high-frequency signal into the examination volume. The high-frequency signal is fed via a signal line 33. The body coil 14 is also configured to receive resonance signals emitted from the patient 100 and output these via a signal line. However, for the purpose of transmitting the high-frequency signal and/or receiving, the body coil 14 may be replaced by local coils 50 that are arranged close to the patient 100 in the patient tunnel 16. In one embodiment, the local coil 50 may be configured for sending and receiving, in which case a body coil 14 is not required.

A control unit 20 supplies the magnet unit 10 with the various signals for the gradient coils 12 and the body coil 14, and evaluates the signals that are received. A control system 23 of the magnetic resonance tomography system coordinates the subsidiary units in this case.

The control unit 20 has a gradient control system 21 that is configured to supply the gradient coils 12 with variable currents via feed lines. The variable currents provide the desired gradient fields in the examination volume in a temporally coordinated manner.

The control unit 20 also has a high-frequency unit 22 that is configured to generate a high-frequency pulse with a predetermined temporal course, amplitude, and spectral power distribution for the purpose of exciting a magnetic resonance of the nuclear spins in the patient 100. Pulse powers in the kilowatt range may be achieved in this case. The individual units are interconnected via a signal bus 25.

The high-frequency signal generated by the high-frequency unit 22 is supplied to the body coil 14 via a signal connection and transmitted into the body of the patient 100 in order to excite the nuclear spins there. In one embodiment, the high-frequency signal may be transmitted via one or a plurality of local coils 50.

The local coil 50 may then receive a magnetic resonance signal from the body of the patient 100, since, due to the close proximity, the signal-to-noise ratio (SNR) of the local coil 50 is better than when receiving via the body coil 14. The MR signal received by the local coil 50 is prepared in the local coil 50 and forwarded to the high-frequency unit 22 of the magnetic resonance tomography system 1 for evaluation and image recording. The signal connection 33 may be used for this purpose, though, for example, a wireless transfer may also be provided.

Subsystems having high energy consumption include the magnet unit 10, with the cooling system for the field magnet 11, the gradient control system 21 that supplies current to the gradient coils 12 via amplifiers, and the high-frequency unit 22 that generates the high-frequency excitation pulses for exciting the nuclear spins. However, the detuning of the local coils 50 by the high-frequency unit 22 also requires considerable power for through-connecting the PIN diodes in each case.

In the embodiment variant illustrated in FIG. 1, the method of the present embodiments is executed by the control system 23 of the control unit 20.

Figure 2:
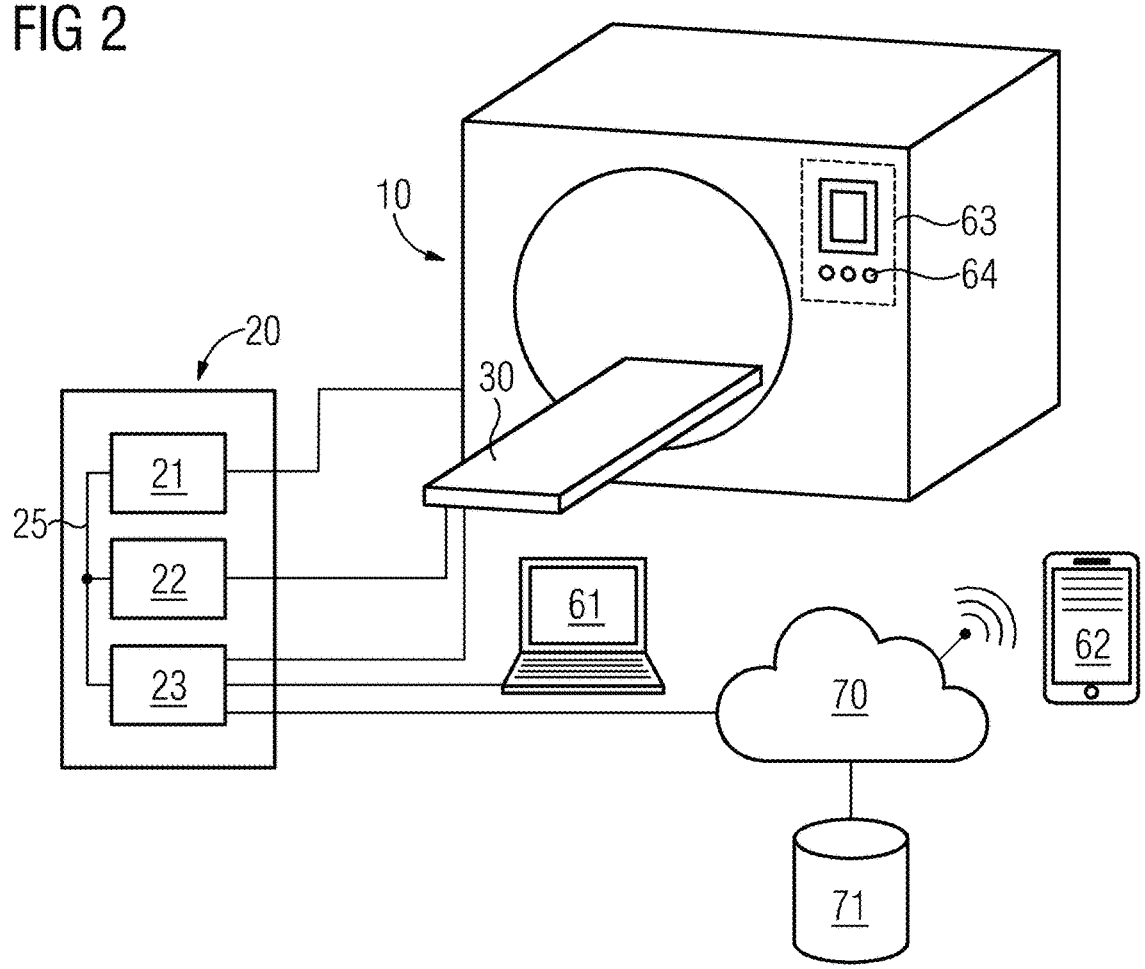
FIG. 2 shows a schematic representation of examples of units of the magnetic resonance tomography system that are involved in an embodiment of a method.

FIG. 2 shows a schematic representation of those units of the magnetic resonance tomography system 1 of the present embodiments that are involved in an embodiment variant of the method of the present embodiments.

Examples of the units to be adjusted for the energy-saving scenarios here are the magnet unit 10, the gradient control system 21, and the high-frequency unit 22; these are controlled by commands from the control system 23 via a bus 25. The magnet unit 10 is connected to the control system 23 via a separate control line 26. Other configurations may, however, also be provided, in which, for example, all of these units are combined in a compact manner in a housing and linked together via the control bus 25. A distributed magnetic resonance system is however also possible, in which only units such as gradient control system 21 and high-frequency unit 22 that are to be provided in the immediate vicinity, due to the power or signals that are to be transferred, are combined with the magnet unit 10, and the control system is realized remotely in a cloud 70 (e.g., on a server 71) via a network.

An example of a subsystem that may cause a change in state of the magnetic resonance tomography system 1 is, for example, the patient couch 30, which is likewise controlled by the control system 23 or informs the control system 23 (e.g., via a limit switch) whether the patient couch 30 has been moved into or out of the patient tunnel 16. Other sensors that capture the presence of a patient and/or the position thereof may also be provided (e.g., a camera, a light barrier, or a pressure sensor mat).

Changes in the state of the magnetic resonance tomography system 1 may also be caused by a user via an operating interface. By way of example, FIG. 2 illustrates an operating computer 61 or operating terminal, a display 63 with operating elements 64, and also a wireless tablet computer 62. In this way, the control system 23 may output outputs to a user or may receive inputs via one, a plurality, or all of these operating interfaces. Operation using just one of these operating interfaces may also be provided.

In one embodiment, dedicated operating elements 64 at the magnet unit 10, for example, may be provided so that it is easier to select an energy saving option directly at the device.

FIG. 3 shows a schematic sequence plan of an embodiment variant of the method. The magnetic resonance tomography system 1 of the present embodiments is configured to execute the method.

In act S20, the control system 23 captures a change in state of the magnetic resonance tomography system 1. The change in state may be captured by a sensor such as, for example, one of the previously described sensors on the patient couch 30. The change in state may, however, also be captured by one of the previously described operating interfaces (e.g., if the user or operator of the magnetic resonance tomography system 1 effects an input that varies a state of the magnetic resonance tomography system 1). In one embodiment, a change in state that is caused system-internally may be provided (e.g., termination of a previously running process such as an image recording or part thereof, a test process or maintenance process, a startup or shutdown of subsystems or of the complete magnetic resonance tomography system 1). The change in state is assessed to determine whether the change in state indicates an operating interruption (e.g., whether it is necessary to wait for a time following the change in state) at least with a certain probability greater than zero. For example, the start of a sequence or a test rules out an operating interruption for all units or at least for relevant subsystems. Conversely, other changes in state such as cancellation of a recording sequence, the withdrawal of the patient couch 30, or the absence of a patient 100 on the patient couch 30 indicate a lengthy interruption. The term units in this case signifies those subsystems of the magnetic resonance tomography system 1 that may be switched into an energy-saving idle state under the control of the control system 23 (e.g., the magnet unit 10, gradient unit 21, or high-frequency unit 22 described with reference to FIG. 2, or also subsystems thereof such as high-frequency power amplifier and detuning unit).

If the change in state indicates an operating interruption lasting for at least a predetermined minimum time (e.g., for more than 1 minute, more than 5 minutes, more than 20 minutes, or for a plurality of hours), provision is made in act S30 for the control system 23 to determine, as a function of the change in state, a plurality of possible energy-saving scenarios for an imminent interruption of the image recording. In this case, possible energy-saving measures may be considered for units or subsystems of the magnetic resonance tomography system 1 that are not immediately required as a result of the captured change in state and may therefore be switched into an energy-saving idle state. In this case, an energy-saving scenario includes at least one energy-saving measure for at least one unit that may be switched into an energy-saving idle state. However, an energy-saving scenario may include a plurality of energy-saving measures and/or units that together are not required in the state of the magnetic resonance tomography system 1 following the change in state and together are switched into an energy-saving idle state. For example, an energy-saving scenario may include a plurality of units that are functionally associated or have similar respective restart times. An energy-saving scenario may include all those units that may be switched into an energy-saving idle state as a result of the state of the magnetic resonance tomography system 1 that has occurred due to the change in state, and may be restarted within a predetermined maximum time for the energy-saving scenario.

In a further act S40, the control system 23 determines restart times for the energy-saving scenarios that have been determined. In an energy-saving scenario including a single relevant unit, the restart time for the energy-saving scenario is the restart time of the single unit. If the energy-saving scenario includes a plurality of units, the restart time of the energy-saving scenario may be the value of the longest restart time of a unit forming part of the energy-saving scenario. Where there are interdependencies, the restart time may also be a total of restart times of the units involved. Hybrid variants may also be provided. The restart times of all possible units for the energy-saving scenarios may be saved in a memory of the control system 23 or on a server 71.

In a further act S50, the control system 23 outputs a selection possibility for a plurality of the energy-saving scenarios, with information relating to the respective restart times, to a user via an operating interface. This may involve, for example, outputting a list or table of the energy-saving scenarios on a display 63, an operating terminal 61, or a tablet computer 62. However, a further possibility is, for example, voice output.

In a further act S70, the control system 23 implements one of the determined energy-saving scenarios. Which one depends on the response of the user, as explained in greater detail below. The implementation is effected by the control system 23 outputting the corresponding adjustment commands to the relevant units or their control systems in order to produce the idle states or, in the case of simple units, also directly interrupting the energy supply.

In an embodiment variant of the method, the method has the act S60 in which the control system 23 captures a user selection of an energy-saving scenario. The selection may take place at an operating interface such as the operating computer 61, the display 63 with the operating elements 64, or a tablet computer 62, as illustrated by way of example. For example, a list or table of the determined energy-saving scenarios and the respective restart times is presented (e.g., in numbers, symbols, or by color coding), and the selection is made by input via a keyboard, mouse, or touch screen. The operating elements 64 are assigned to the energy-saving scenarios on the display (e.g., by virtue of position, haptic or visual marking). An acoustic output may also be provided, with selection via voice input or gestures that are captured by a camera.

The implementation of the selection is then effected as described above by the control system 23.

In a possible embodiment variant of the method, after a predetermined time without user input following the output in act S50, the control system 23 also interprets this as a user selection and assumes a predetermined default value as an input of the user (see act S65). The predetermined time may be less than 1 minute, 5 minutes, 10 minutes, or 1 hour, for example. In this case, the control system may select the determined energy-saving scenario having the shortest restart time as a predetermined default value. However, a default energy-saving scenario that may be configured by the user as described below may also be provided, for example.

In an embodiment variant of the method, the determination of the energy-saving scenarios in the act S30 is effected as a function of a parameter. For example, the user may specify the previously described default energy-saving scenario as a parameter. In one embodiment, specific changes in state may be assigned to likely operational interruptions. In one embodiment, an adjustable time dependency may be provided, such that the parameters change at specific times of day, for example.

The variation of the parameter or parameters takes place in act S10 as a dialog with the user via an operating interface. The parameter or parameters are then changed by the control system 23 in accordance with the input from the user.

In a possible embodiment variant of the method, in act S50, the control system outputs the selection possibilities for output at a remote operating interface (e.g., an operating computer 61 or tablet computer 62) that is connected to the control system 23 via a wire-based or wireless data network. Correspondingly, the control system receives the user selection in an opposite direction from the operating interface in act S60. A deeper and more effective energy saving state with a longer restart time may be applicable precisely when no user is present at the device. The energy-saving measures may then be optimized (e.g., via a central and continuously attended service center). A central control system may be provided by a server or artificial intelligence as a virtual user in the service center.

In an embodiment variant of the method, in act S80, the control system 23 terminates the energy-saving measure or the energy-saving scenario in response to a user input, and restarts the units that were switched into an energy-saving idle state as per the energy-saving scenario.

Although the invention is illustrated and described in detail above with reference to the exemplary embodiments, the invention is not limited by the examples disclosed herein, and other variations may be derived therefrom by a person skilled in the art without thereby departing from the scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a magnetic resonance tomography system having a control system for controlling an image recording, the method comprising:
   capturing, by the control system, a change in state of the magnetic resonance tomography system;
   assessing, by the control system, whether the change in state indicates an operating interruption;
   determining, by the control system, a plurality of possible energy-saving scenarios for an imminent interruption of the image recording as a function of the change in state;
   determining, by the control system, restart times for the plurality of possible energy-saving scenarios;
   outputting, by the control system, a selection possibility for a plurality of energy-saving scenarios, with information relating to the respective restart times, to a user; and
   implementing, by the control system, an energy-saving scenario.

2. The method of claim 1, further comprising capturing, by the control system, a user selection of an energy-saving scenario,
   wherein the control system is configured to implement the user selected energy-saving scenario.

3. The method of claim 2, further comprising:
   sending, by the control system, the selection possibilities to a remote operating interface for output in the outputting; and
   receiving the user selection from the operating interface in the capturing.

4. The method of claim 2, wherein the magnetic resonance tomography system has operating elements for inputting the user selection, and
   wherein the capturing comprises capturing the user selection via the operating elements.

5. The method of claim 1, wherein after a predetermined time without user input following the outputting, the method further comprises:
   selecting, by the control system, the energy-saving scenario having a shortest restart time; and
   implementing the selected energy-saving scenario.

6. The method of claim 1, wherein in the determining of the plurality of possible energy-saving scenarios, the determining takes place as a function of a parameter, and
   wherein the method further comprises changing, by the control system, the parameter as a function of a user input in a user dialog, such that the parameter is varied.

7. The method of claim 1, further comprising terminating, by the magnetic resonance tomography, the energy-saving scenario in response to a user input.

8. A magnetic resonance tomography system comprising:
   a control system configured to:
      capture a change in state of the magnetic resonance tomography system;
      assess whether the change in state indicates an operating interruption;
      determine a plurality of possible energy-saving scenarios for an imminent interruption of the image recording as a function of the change in state;
      determine restart times for the plurality of possible energy-saving scenarios;
      output a selection possibility for a plurality of energy-saving scenarios, with information relating to the respective restart times, to a user; and
      implement an energy-saving scenario.

9. In a non-transitory computer-readable storage medium that stores instructions executable by a control system of a magnetic resonance tomography system to operate the magnetic resonance tomography system having a control system for controlling an image recording, the instructions comprising:
   capturing a change in state of the magnetic resonance tomography system;
   assessing whether the change in state indicates an operating interruption;
   determining a plurality of possible energy-saving scenarios for an imminent interruption of the image recording as a function of the change in state;
   determining restart times for the plurality of possible energy-saving scenarios;
   outputting a selection possibility for a plurality of energy-saving scenarios, with information relating to the respective restart times, to a user; and
   implementing an energy-saving scenario.

10. The non-transitory computer-readable storage medium of claim 9, wherein the instructions further comprise capturing a user selection of an energy-saving scenario,
  wherein the control system is configured to implement the user selected energy-saving scenario.

11. The non-transitory computer-readable storage medium of claim 10, wherein the instructions further comprise:
  sending the selection possibilities to a remote operating interface for output in the outputting; and
  receiving the user selection from the operating interface in the capturing.

12. The non-transitory computer-readable storage medium of claim 10, wherein the magnetic resonance tomography system has operating elements for inputting the user selection, and
  wherein the capturing comprises capturing the user selection via the operating elements.

13. The non-transitory computer-readable storage medium of claim 9, wherein after a predetermined time without user input following the outputting, the instructions further comprise:
  selecting the energy-saving scenario having a shortest restart time; and
  implementing the selected energy-saving scenario.

14. The non-transitory computer-readable storage medium of claim 9, wherein in the determining of the plurality of possible energy-saving scenarios, the determining takes place as a function of a parameter, and
  wherein the instructions further comprise changing the parameter as a function of a user input in a user dialog, such that the parameter is varied.

15. The non-transitory computer-readable storage medium of claim 9, wherein the instructions further comprise terminating, by the magnetic resonance tomography, the energy-saving scenario in response to a user input.

* * * * *